(12) United States Patent
Cohen

(10) Patent No.: US 6,442,047 B1
(45) Date of Patent: Aug. 27, 2002

(54) POWER CONVERSION APPARATUS AND METHODS WITH REDUCED CURRENT AND VOLTAGE SWITCHING

(75) Inventor: Isaac Cohen, Dix Hills, NY (US)

(73) Assignee: Lambda Electronics, Inc., Melville, NY (US)

( * ) Notice: Subject to any disclaimer, the term of this patent is extended or adjusted under 35 U.S.C. 154(b) by 0 days.

(21) Appl. No.: 09/648,837

(22) Filed: Aug. 25, 2000

Related U.S. Application Data
(60) Provisional application No. 60/158,538, filed on Oct. 8, 1999.

(51) Int. Cl.[7] .................... H02M 3/335; H02M 7/5387
(52) U.S. Cl. ................................. 363/17; 363/132
(58) Field of Search ............................ 363/17, 16, 98, 363/127, 132

(56) References Cited

U.S. PATENT DOCUMENTS

| | | | | |
|---|---|---|---|---|
| 4,017,784 A | * | 4/1977 | Simmons et al. ............. | 363/17 |
| 4,415,959 A | | 11/1983 | Vinciarelli ................... | 363/21 |
| 4,425,613 A | * | 1/1984 | Shelly ......................... | 363/26 |
| 4,441,146 A | | 4/1984 | Vinciarelli ................... | 363/20 |
| 4,648,020 A | | 3/1987 | Vinciarelli ................... | 363/71 |
| 4,675,797 A | | 6/1987 | Vinciarelli ................... | 363/21 |
| 4,823,249 A | | 4/1989 | Garcia, II ..................... | 363/48 |
| 4,855,888 A | * | 8/1989 | Henze et al. ................. | 363/17 |
| 4,953,068 A | | 8/1990 | Henze ......................... | 363/17 |
| 4,967,332 A | | 10/1990 | Claydon et al. .............. | 363/17 |
| 5,027,246 A | | 6/1991 | DeDoncker et al. .......... | 363/16 |
| 5,132,888 A | | 7/1992 | Lo et al. ...................... | 363/17 |
| 5,157,319 A | | 10/1992 | Klontz et al. ................. | 320/2 |
| 5,157,592 A | | 10/1992 | Walters ........................ | 363/17 |
| 5,177,675 A | | 1/1993 | Archer ......................... | 363/25 |
| 5,198,969 A | | 3/1993 | Redl et al. .................... | 363/17 |
| 5,235,501 A | | 8/1993 | Stuart et al. .................. | 363/17 |
| 5,245,520 A | * | 9/1993 | Imbertson .................... | 363/17 |
| 5,283,727 A | | 2/1994 | Kheraluwala et al. ........ | 363/98 |
| 5,287,261 A | | 2/1994 | Ehsani ......................... | 363/124 |
| 5,291,384 A | | 3/1994 | Mammano et al. ........... | 363/17 |
| 5,301,096 A | | 4/1994 | Klontz et al. ................. | 363/37 |
| 5,327,333 A | | 7/1994 | Boylan et al. ................ | 363/21 |
| 5,341,083 A | | 8/1994 | Klontz et al. ................. | 320/2 |
| 5,341,280 A | | 8/1994 | Divan et al. .................. | 363/37 |
| 5,363,298 A | | 11/1994 | Jacobs .......................... | 363/56 |
| 5,412,557 A | | 5/1995 | Lauw ........................... | 363/37 |
| 5,414,609 A | * | 5/1995 | Levran et al. ................ | 363/17 |
| 5,430,633 A | * | 7/1995 | Smith ........................... | 363/20 |
| 5,491,624 A | | 2/1996 | Levran et al. ................ | 363/87 |
| 5,528,481 A | | 6/1996 | Caldeira et al. .............. | 363/20 |
| 5,559,685 A | | 9/1996 | Lauw et al. .................. | 363/37 |
| 5,592,137 A | | 1/1997 | Levran et al. ................ | 336/195 |
| 5,625,539 A | * | 4/1997 | Nakata et al. ................ | 363/17 |
| 5,627,743 A | | 5/1997 | Sadarnac et al. ............. | 363/124 |
| 5,781,419 A | | 7/1998 | Kutkut et al. ................. | 363/17 |
| 5,838,558 A | | 11/1998 | Tan et al. ..................... | 363/91 |

(List continued on next page.)

Primary Examiner—Rajnikant B. Patel
(74) Attorney, Agent, or Firm—Myers Bigel Sibley & Sajovec

(57) ABSTRACT

A power conversion apparatus, e.g., a DC-to-DC converter, includes a transformer having primary and secondary windings. A first switching circuit has an input port configured to be coupled across a DC power source and an output port coupled to the primary winding of the transformer. A switch control circuit is operatively associated with the switching circuit and causes the switching circuit to alternately apply first and second polarity voltages to the primary winding. A second switching circuit is operative to transfer energy to a load from the secondary winding via a first capacitor responsive to application of the first polarity voltage to the primary winding and to transfer energy to the load from the secondary winding via a second capacitor responsive to application of the second polarity voltage to the primary winding. The first switching circuit may be operated such that switches therein may be operated under reduced current and/or reduced voltage conditions. Related power conversion methods are also discussed.

74 Claims, 11 Drawing Sheets

U.S. PATENT DOCUMENTS

| | | | |
|---|---|---|---|
| 5,847,548 A | 12/1998 | He et al. | 323/222 |
| 5,870,291 A | 2/1999 | Farrington et al. | 363/17 |
| 5,877,945 A | 3/1999 | Liu | 363/17 |
| 5,886,884 A | 3/1999 | Baek et al. | 363/48 |
| 5,889,667 A | 3/1999 | Bernet | 363/127 |
| 5,903,446 A | 5/1999 | Huillet et al. | 363/17 |
| 5,946,200 A * | 8/1999 | Kim et al. | 363/17 |
| 5,949,664 A | 9/1999 | Bernet et al. | 363/37 |
| 5,982,645 A | 11/1999 | Levran et al. | 363/37 |
| 5,999,417 A | 12/1999 | Schlecht | 363/16 |

* cited by examiner

POWER CONVERSION APPARATUS AND METHODS WITH REDUCED CURRENT AND VOLTAGE SWITCHING

RELATED APPLICATION

This application claims the priority of U.S. Provisional Application No. 60/158,538 filed Oct. 8, 1999, the disclosure of which is hereby incorporated herein by reference.

BACKGROUND OF THE INVENTION

The present invention relates to power conversion apparatus and methods, and more particularly, to switching converters and methods of operation thereof.

DC-to-DC power conversion is commonly achieved using switching regulator circuits. These switching regulator circuits often include one or more switching elements that selectively couple a DC power source to a primary winding of a transformer such that an AC voltage is produced on a secondary winding of the transformer. This AC voltage may then be rectified and filtered to produce a DC output voltage. The DC output voltage may be regulated by controlling the switching frequency and/or duty cycle of the switching elements.

It is generally desirable that the switching element(s) of a switching regulator operate at high frequencies to allow for the use of small and lightweight magnetic components (e.g., lightweight transformers and inductors). An unfortunate result of such high frequency switching operations may be increased power dissipation due to resistance and capacitance associated with the switching element(s). Accordingly, it is generally desirable for the switching element(s) of a switching regulator to switch under minimized current and/or voltage conditions to reduce power dissipation.

Examples of power converters that may provide reduced or "zero current" switching (ZCS) are described in U.S. Pat. No. 4,415,959 to Vinciarelli; and in U.S. Pat. No. 4,823,249 to Garcia, II. Examples of power converters that may provide for reduced or "zero voltage" switching (ZVS) are described in "Design Review: 500 W, 40 W/in³ Phase Shifted ZVT Power Converter," Topic 4, SEM-900 *Power Supply Design Seminar Manual*, Unitrode Integrated Circuit Corporation; "Optimum ZVS Full-Bridge DC/DC Converter with PWM Phase Shift Control: Analysis, Design Considerations, and Experimental Results," by Balogh et al., *APEC '94 Proceedings*, pp. 159–165 (1994); "A Novel Soft-Switching Full Bridge DC/DC Converter: Analysis, Design Considerations, and Experimental Results At 1.5 kW, 100 kHz," by Redl et al., *PESC '90 Proceedings*, pp. 162–172 (1990); "Designing a Phase Shifted Zero Voltage Transition (ZVT) Power Converter," Topic 3, *SEM-900 Power Supply Design Seminar Manual*, Unitrode Integrated Circuit Corporation; "A Fixed Frequency ZVS High Power SMR Converter with Zero to Rated Load Variation Capability," by Moshopolous et al., *INT-ELEC '92 Proceedings*, pp. 351–358 (1992); "UC3879 Phase-Shift Resonant Controller" Data Sheet, Unitrode Integrated Circuit Corporation; "The New UC3879 Phase Shifted PWM Controller Simplifies the Design of Zero Voltage Transition Full Bridge Converters," *Application Note* U154, Unitrode Integrated Circuit Corporation.

SUMMARY OF THE INVENTION

According to embodiments of the invention, a power conversion apparatus, e.g., a DC-to-DC converter, includes a transformer having primary and secondary windings. A first switching circuit has an input port configured to be coupled across a DC power source and an output port coupled to the primary winding of the transformer. A switch control circuit is operatively associated with the first switching circuit and causes the first switching circuit to alternately apply first and second polarity voltages to the primary winding. A second switching circuit is operative to transfer energy to a load from the secondary winding via a first capacitor responsive to application of the first polarity voltage to the primary winding and to transfer energy to the load from the secondary winding via a second capacitor responsive to application of the second polarity voltage to the primary winding.

According to embodiments of the invention, the first switching circuit comprises at least one switch, and the switch control circuit constrains the at least one switch to operate when current in the at least one switch falls to a predetermined level, e.g., substantially near zero. The switch control circuit may operate the at least one switch responsive to a current through the transformer. Alternatively, the switch control circuit may estimate a time when current in the at least one switch will reach the predetermined level and may operate the at least one switch based on the estimated time.

According to other embodiments of the invention, the first switching circuit comprises first and second half bridges, and the switch control circuit controls a time delay between operations of the first and second half-bridges. The switch control circuit may control the time delay such that the first and second half-bridges operate under substantially zero current switching conditions. In some embodiments of the invention, the switch control circuit maintains a fixed time delay between operations of the first and second half-bridges. In other embodiments, the switch control circuit controls the time delay responsive to a sensed current through the transformer and/or responsive to an input voltage applied to the switching circuit.

According to other aspects of the invention, the first switching circuit comprises at least one switch, and the switch control circuit constrains the at least one switch to operate when voltage across the at least one switch falls to a predetermined level, for example, substantially near zero. The first switching circuit may comprise a first half-bridge including first and second switches and a second half-bridge including third and fourth switches. The switch control circuit, in transitioning the first switching circuit from a first state in which the second and third switches are closed and the first and fourth switches are open and a second state in which the first and third switches are closed and the second and fourth switches are open, may open the second switch before closing the first switch such that a voltage across the first switch is reduced, for example, to a voltage substantially near zero, before the first switch closes. The switch control circuit, in transitioning the first switching circuit from the second state to a third state in which the first and fourth switches are closed and the first and third switches are open, may also open the third switch before closing the fourth switch such that a voltage across the fourth switch is reduced, for example, to a voltage substantially near zero, before the fourth switch closes.

In other embodiments of the invention, a power conversion apparatus includes a transformer having primary and secondary windings. First and second half-bridges are configured to be coupled across a DC power source and coupled to respective first and second terminals of the primary winding of the transformer. An output circuit is coupled to the secondary winding of the transformer and includes first and second capacitors and at least one inductor configured to be coupled to a load. The output circuit is operative to transfer energy to the load from the secondary winding via the first capacitor responsive to application of a first polarity voltage to the primary winding of the transfer and to transfer energy to the load from the secondary winding via the second capacitor responsive to application of a second polarity voltage to the primary winding of the transformer. A switch control circuit, operatively associated with the first and second half-bridges, varies a frequency at which the first and second half-bridges operate responsive to an output voltage produced by the output circuit.

In some embodiments of the invention, the switch control circuit is operative to control a time delay between operations of the first and second half-bridges. For example, the switch control circuit may control the time delay such that the first and second half-bridges operate under substantially zero current switching conditions.

For example, the switch control circuit maintains a fixed time delay between operations of the first and second half-bridges, or the switch control circuit may vary the time delay responsive to a sensed current and/or to an input voltage applied to the first and second half-bridges.

In still other embodiments of the invention, a power conversion apparatus includes transformer having primary and secondary windings. A switching circuit is coupled to the primary winding of the transformer and configured to be coupled to a DC power source, and is operative to couple the DC power source to the primary winding of the transformer with a first polarity in a first state and to couple the DC power source to the primary winding of the transformer with a second polarity in a second state. An output circuit is coupled to the secondary winding of the transformer and includes first and second capacitors and at least one inductor configured to be coupled to a load. The output circuit is operative to transfer energy to the load from the secondary winding via the first capacitor responsive to the first state of the switching circuit and to transfer energy to the load from the secondary winding via the second capacitor responsive to the second state of the switching circuit. The switching circuit may vary a frequency at which the switching circuit alternates between the first and second states to control an output voltage applied to the load.

In other embodiments of the invention, the output circuit, when the switching circuit is in the first state, delivers current from the secondary winding to the first capacitor responsive to current in the secondary winding exceeding a first level and reduces current in the secondary winding responsive to discharge of the first capacitor. The output circuit, when the switching circuit is in the second state, also delivers current from the secondary winding to the second capacitor responsive to current in the secondary winding exceeding a second level and reduces current in the secondary winding responsive to discharge of the second capacitor. Respective capacitances of the first and second capacitors may be such that respective discharge currents produced from respective ones of the first and second capacitors in response to respective ones of the first and second states of the switching circuit are sufficient to cause the output circuit to block current flow in the secondary winding.

In still other embodiments, the output circuit, when the switching circuit is in the first state, delivers current from the secondary winding to the first capacitor responsive to current in the secondary winding exceeding a current demand of the load and then discharges current from the first capacitor through the at least one output inductor to supply current to the load. The output circuit, when the switching circuit is in the second state, also delivers current from the secondary winding to the second capacitor responsive to current in the secondary winding exceeding a current demand of the load and then discharges the second capacitor through the at least one output inductor to supply current to the load. Respective capacitances of the first and second capacitors may be such that respective peak discharge currents produced from respective ones of the first and second capacitors responsive to respective ones of the first and second states of the switching circuit are greater than or equal to a current delivered to the load via the at least one inductor.

In yet other embodiments of the invention, the apparatus further comprises a sensor that senses a current in at least one of the primary and secondary windings. The switching circuit is responsive to the sensor such that the first switching circuit short-circuits the primary winding when the sensed current meets a predetermined criterion. In other embodiments, a switch control circuit predicts a time at which current in at least one of the primary winding and the secondary winding meets a predetermined criterion and causes the switching circuit to short the primary winding based on the predicted time.

According to another aspect of the invention, the output circuit comprises a second switching circuit, for example, a diode bridge, that controls current flow between the secondary winding, the first and second capacitors and the at least one output inductor. The second switching circuit may control current flow between the secondary winding, the first and second capacitors and the at least one output inductor such that, when the first switching circuit is in the first state, the second switching circuit clamps the first capacitor when current in the secondary winding is less than a first level, conducts current from the secondary winding to the first capacitor responsive to current in the secondary winding exceeding a second level, and reduces current flow in the secondary winding responsive to discharge of the first capacitor. When the first switching circuit is in the second state, the second switching circuit may clamp the second capacitor when current in the secondary winding is less than a third level, conduct current from the secondary winding to the second capacitor when current in the secondary winding exceeds a fourth level, and reduce current flow in the secondary winding responsive to discharge of the second capacitor.

According to method embodiments of the invention, first and second polarity voltages are alternately applied to a primary winding of a transformer. Energy is transferred to a load from a secondary winding of the transformer via a first capacitor responsive to application of the first polarity voltage to the primary winding. Energy is transferred to the load from the secondary winding via a second capacitor responsive to application of the second polarity voltage to the primary winding. The step of alternately applying first and second polarity voltages to a primary winding may comprise operating a switching circuit coupled to a DC power source and to the primary winding such that at least one switch of the switching circuit is constrained to operate when current in the at least one switch falls to a predetermined level. The step of alternately applying first and second polarity voltages to a primary winding may also comprise operating the switching circuit that at least one switch of the switching circuit is constrained to operate when voltage across the at least one switch falls to a predetermined level.

According to other method embodiments, the step of alternately applying first and second polarity voltages to a primary winding comprises controlling a frequency at which first and second half-bridges of a switching circuit coupled to a DC power source and to the primary winding operate. The step of alternately applying first and second polarity voltage may also include controlling a time delay between operations of the first and second bridges, e.g., to achieve reduced or substantially zero current switching. For example, a fixed time delay may be maintained between operations of the first and second half-bridges, or the time delay may be controlled responsive to a sensed current through the transformer and/or an input voltage applied to the switching circuit.

DETAILED DESCRIPTION OF EMBODIMENTS

Figure 1:
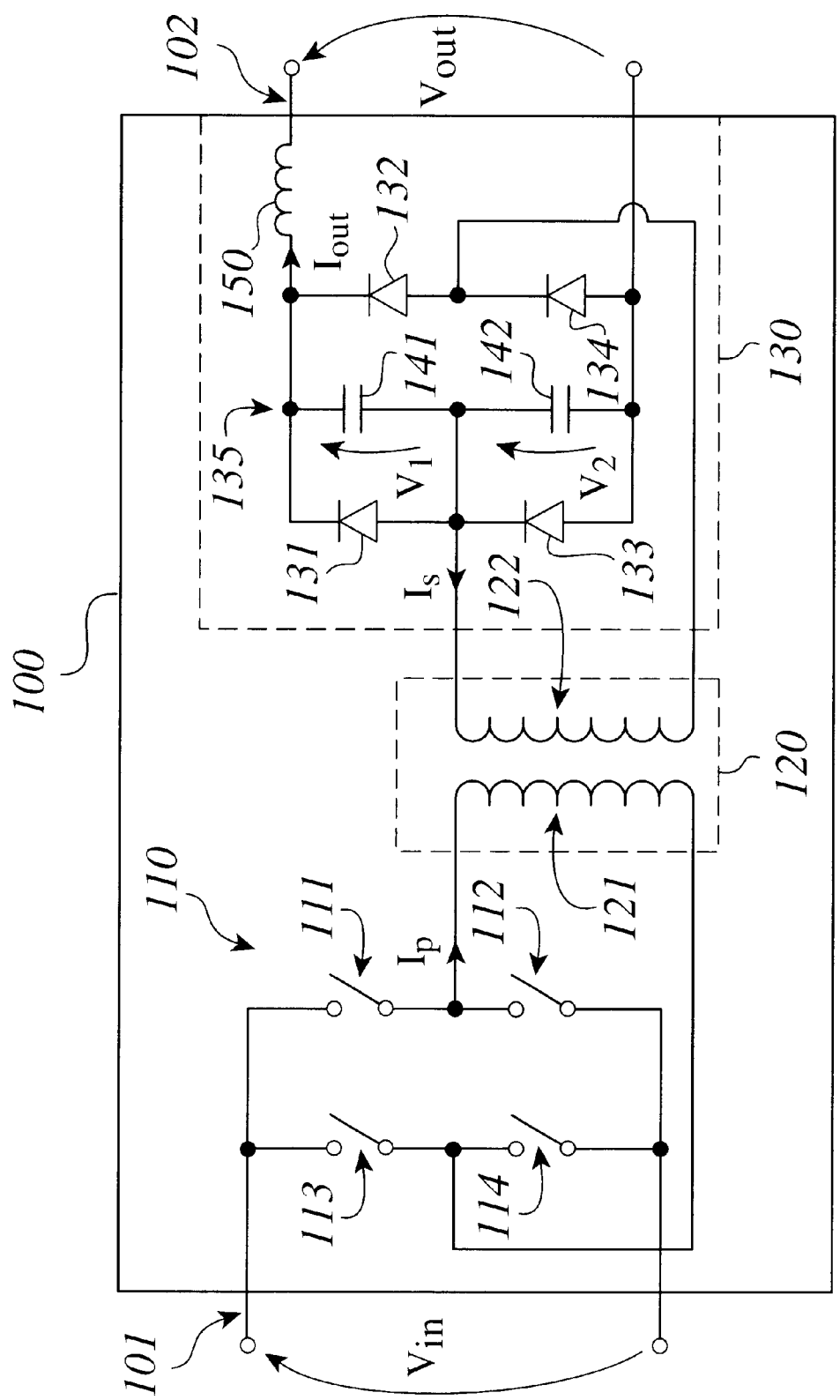
FIG. 1 is a schematic diagram illustrating a power conversion apparatus and method according to embodiments of the invention.

The present invention now will be described more fully hereinafter with reference to the accompanying drawings, in which preferred embodiments of the invention are shown. This invention may, however, be embodied in many different forms and should not be construed as limited to the embodiments set forth herein;

rather, these embodiments are provided so that this disclosure will be thorough and complete, and will fully convey the scope of the invention to those skilled in the art.

In the drawings, like numbers refer to like elements.

FIG. 1 illustrates a power conversion apparatus 100 and method according to embodiments of the invention. The power conversion apparatus 100 includes a full-bridge switching circuit 110 coupled to a transformer 120 and an output circuit 130. The switching circuit 110 includes first, second, third and fourth switches 111, 112, 113, 114. An input port of the switching circuit 110 is coupled to a DC power source (not shown) at an input port 101 of the apparatus 100. An output port of the switching circuit 110 is coupled to a primary winding 121 of the transformer 120.

The output circuit 130 includes a switching circuit 135, here shown as a full-bridge rectifier circuit including diodes 131, 132, 133, 134. The switching circuit 135 has an input port coupled to a secondary winding 122 of the transformer 120. The output circuit 130 also includes first and second capacitors 141, 142, respective ones of which couple a first terminal of the input port of the switching circuit 135 to respective first and second terminals of an output port of the switching circuit 135. The output circuit 130 further includes an output inductor 150 configured to be coupled in series with the switching circuit 135 and a load (not shown) coupled to an output port 102 of the apparatus 100. The switching circuit 135, first and second capacitors 141, 142, and the output inductor 150 are used in resonant energy transfer operations, as described in detail below.

It will be appreciated that the power conversion apparatus 100 may be implemented using a variety of different electronic components and configurations. For example, the input switching circuit 110 may be implemented using switching transistors, such as insulated gate bipolar transistors or MOSFETs, or other suitable switching devices. The switching circuit 135 may be implemented using a passive diode bridge, as shown in FIG. 1, or by using an active circuit including switching devices, such as transistors, that may be controlled to provide similar functionality.

Figure 2:
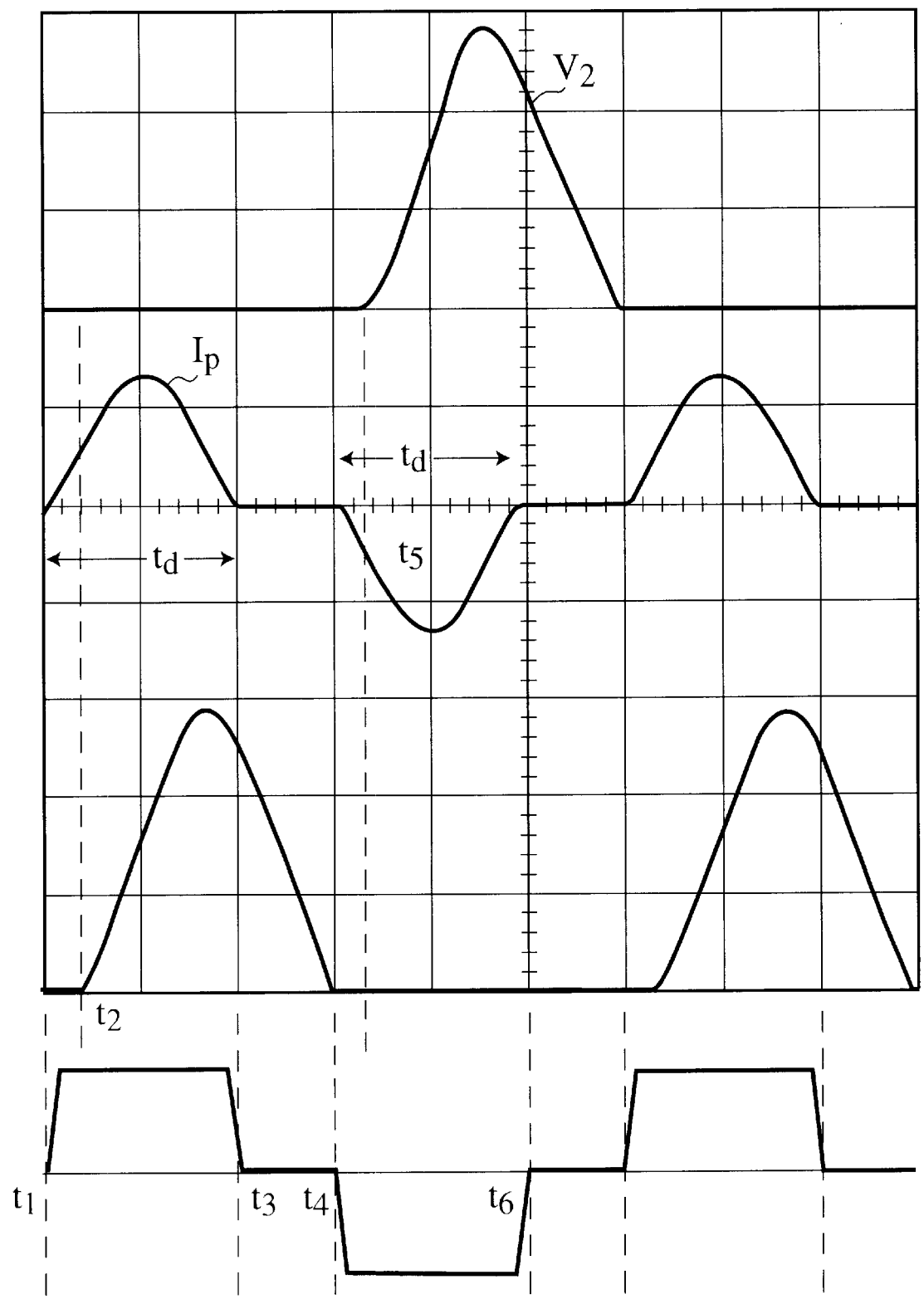
FIG. 2 is a waveform diagram graphically illustrating exemplary operations of a power conversion apparatus according to embodiments of the invention.

Exemplary operations of the power conversion apparatus of FIG. 1 will now be described with reference to FIG. 1 and the waveform diagrams of FIG. 2. In particular, FIG. 2 illustrates a two-part resonant energy transfer process in which energy is transferred from the secondary winding 122 of the transformer 120 to the output port 102 via respective ones of the capacitors 141, 142. It is assumed that prior to a time $t_1$, switches 112, 114 are "on" (closed) and switches 111, 113 are "off" (open), shorting the primary winding 121 of the transformer 120. It is also assumed that, prior to time $t_1$, a current freewheels through the output inductor 150 and the diodes 131, 132, 133, 134. After time $t_1$, switch 112 is turned off and switch 111 is turned on. As the secondary winding 122 of the transformer 120 is shorted by the conducting diodes 131, 132, 133, 134, the input voltage $V_{in}$ applied at the input port 101 initially appears across a leakage inductance (not shown) of the transformer 120, causing the primary current $I_p$ and the reflected secondary current $I_s$ to increase in a linear fashion. As the secondary current $I_s$ increases, current in the diodes 131, 133 decreases.

At a time $t_2$ when the secondary current $I_s$ becomes equal or greater than the output current $I_{out}$ in the output inductor 150, current in the diodes 131, 133 is reduced to approximately zero. After time $t_2$, current passing through the output inductor 150 is channeled through diodes 132, 134 and the secondary winding 122 of the transformer 120, and is reflected in the primary current $I_p$. Concurrently, a circuit including the capacitor 141 and the leakage inductance of the transformer 120 is effectively coupled in parallel with the secondary winding 122 of the transformer 120, causing the capacitor 141 to resonantly charge and generating a voltage $V_1$ across the capacitor 141. As the capacitor 141 is discharged through the output inductor 150, current $I_s$ through the secondary winding 122 is reduced, a reduction that is reflected in the primary current $I_p$. If the discharge current from the capacitor 141 is sufficiently high, the primary current $I_p$ may be reduced to substantially near zero at a time $t_3$.

When the primary current $I_p$ approaches zero, switch 114 can be turned off and switch 113 can turned on under substantially reduced current conditions. Because the capacitor 141 has been charged to a voltage $V_1$ greater than the input voltage $V_{in}$, the diode 132 becomes reverse biased, causing the secondary current $I_s$ and the reflected primary current $I_p$ to remain substantially near zero, even if switch 114 30 remains on and switch 113 remains on after the primary and secondary currents $I_p$, $I_s$ approach zero. The capacitor 141 continues to discharge to supply the output current $I_{out}$. In this manner, energy is transferred from the secondary winding 122 of the transformer 120 to the output port 102 via resonant charging of the capacitor 141.

When the voltage $V_1$ across the capacitor 141 approaches zero, a current again begins to freewheel through the output inductor 150 and the diodes 131, 132, 133, 134. Opening switch 114 and closing switch 113 shorts the primary winding 121 of the transformer 120.

At a time $t_4$, a second stage of the energy transfer cycle is begun by turning switch 131 off and turning switch 132 on, applying the input voltage $V_{in}$ across the primary winding 121 of the transformer 120 with a reversed polarity. The primary current $I_p$ increases in magnitude as the input voltage $V_{in}$ is applied across the leakage inductance of the transformer 120. When the reflected secondary current $I_s$ reaches the current $I_{out}$ in the inductor 150 at time $t_5$, diodes 133, 132 turn off, causing current to be channeled through the secondary winding 122 of the transformer 120 and the output inductor 150 via the diodes 131, 134. Concurrently, the capacitor 142 begins charging, increasing the magnitude of the voltage $V_2$. When the capacitor 142 begins to discharge, the primary and secondary currents $I_p$, $I_s$ begin to decrease. If the discharge current is sufficiently high, the primary current $I_p$ is reduced to at or near zero at time $t_6$, again allowing switch 113 to be turned off and switch 114 to be turned on under substantially reduced current conditions.

Figure 3:
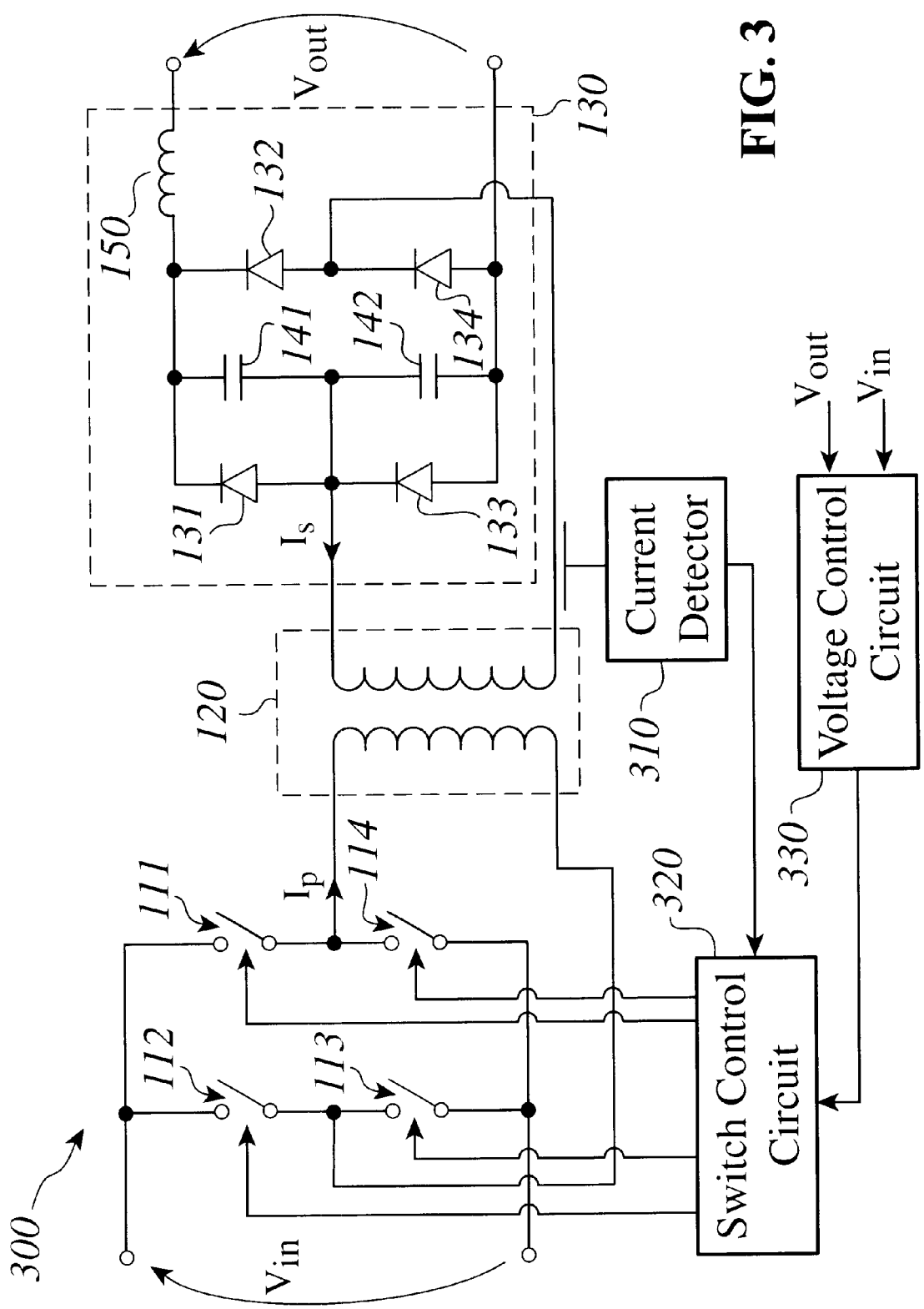
FIGS. 3–5 and 7 are schematic diagrams illustrating power conversion apparatus according to embodiments of the invention.

It will be appreciated that the above-described operations may be varied within the scope of the present invention. For example, the operations described above include switching the switches 111, 112, 113, 114 at times at which the primary current $I_p$ has reached at or near zero, which may minimize switching losses. However, it will be appreciated that the present invention also includes "suboptimal" variations in which the switches 111, 112, 113, 114 are operated when the primary current $I_p$ falls to a predetermined non-zero level, such that lesser switching loss reductions may nonetheless be effected. In addition, although FIG. 3 illustrates operating the switches 111, 112, 113, 114 substantially instantaneously upon reduction of the primary current $I_p$ to zero, these switching operations may be delayed as described above. Moreover, although it may be optimal to select the capacitors 141, 142 such that peak discharge current is sufficiently high to force the primary current $I_p$ to near zero, alternative configurations that utilize capacitor values that provide lesser peak discharge currents may also be used with the present invention.

The full-bridge switching circuit 110 comprising switches 111, 112, 113, 114 may be viewed as a combination of a first half-bridge (switches 111, 112) and a second half-bridge (switches 113, 114). The output voltage $V_{out}$ produced by the apparatus 100 may be regulated by modulating the frequency at which the half bridges operate. In particular, the half-bridges may be operated at near 50% duty cycles, with a time delay between the operation of the first half-bridge (switches 111, 112) and the second half-bridge (switches 113, 114) that preferably is at least as long at the time interval $t_d$ from the time the primary current $I_p$ begins to flow and the time the primary current $I_p$ again falls to substantially near zero. It will be appreciated that this is a fundamentally different operational technique than those used in many conventional converters, i.e., converters that modulate pulse width and/or control phase shift.

The time interval $t_d$ may be expressed as:

$$t_d = \left(\frac{I_0}{V_{in}} * L\right) + \frac{\arcsin\left(I_0 \frac{\rho}{V_{in}}\right) + \pi}{\omega_0}, \quad (1)$$

where $$\rho = \sqrt{\frac{L}{C}},$$

$$\omega_0 = \sqrt{LC},$$

C is the capacitance of capacitors 141, 142, and L is the inductance of the output inductor 150. It will be appreciated from equation (1) that as the input voltage $V_{in}$ increases, the time interval $t_d$ decreases, thus allowing the delay between operation of the leading and trailing half bridges to be decreased.

FIG. 3 illustrates a power conversion apparatus 300 and methods according to embodiments of the invention in which a regulated output voltage is produced by varying a frequency at which alternating polarity voltages are applied to the primary winding of a transformer 120 responsive to an output voltage $V_{out}$ produced by an output circuit 130 coupled to the secondary winding of the transformer 120, while a secondary current $I_s$ is sensed to generate appropriate switch control signals to control a time delay between applications of the alternating polarity voltages to thereby provide reduced or substantially zero current switching. Elements of FIG. 3 that are identical to those illustrated in FIG. 1 are indicated by like reference numerals, and detailed description thereof will be omitted in light of the previous description with reference to FIG. 1. The power conversion apparatus 300 includes a voltage control circuit 330 that monitors the output voltage $V_{out}$ and $V_{in}$ and responsively generates a frequency command (e.g., an analog voltage or digital value) as an input for a switch control circuit 320. The switch control circuit 320 controls the switching frequencies of the first half-bridge (switches 111, 112) and the second half-bridge (switches 113, 114) responsive to the frequency command. The switch control circuit 320 is also operative to control the time delay between operations of the first and second half-bridges responsive to secondary current $I_s$ sensed by a current detector 310. The switch control circuit 320 may maintain a time delay between operation of the first and second half-bridges that causes the switches 111, 112, 113, 114 to operate under reduced or substantially zero current switching conditions, as described above. In addition, the switch control circuit 320 also may maintain appropriate "dead time" between opening and closing operations of the switches of the each of the half-bridges (switches 111, 112 and switches 113, 114) to provide reduced or substantially zero voltage switching as described in greater detail below.

It will be further appreciated that the embodiments illustrated in FIG. 3 are offered for illustrative purposes, and that a variety of circuit implementations may be used with the present invention. For example, it will be appreciated that, in general, the voltage control circuit 330 and the switch control circuit 320 may be implemented using analog and/or digital circuitry, including, but not limited to, special-purpose analog and/or digital circuits and/or special or general purpose computing devices running firmware or software, such as microcontrollers, microprocessors, digital signal processors, and the like. It will also be appreciated that functions of such components may be integrated in a single device, such as a microcontroller, microprocessor, or application specific integrated circuit (ASIC), or may distributed among multiple devices.

Figure 4:
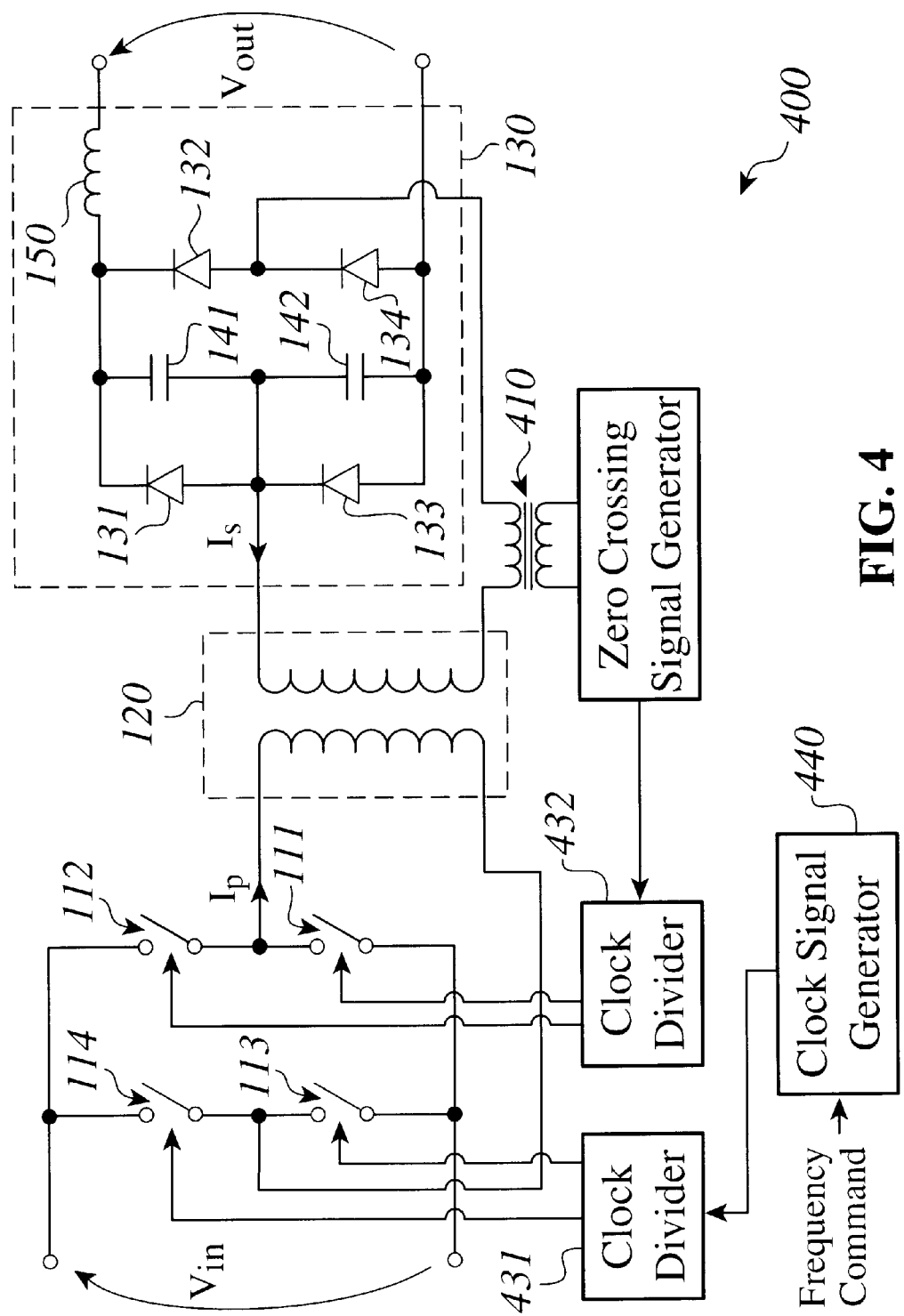

FIG. 4 illustrates a power conversion apparatus 400 according to other embodiments of the invention. Elements of FIG. 4 that are identical to those illustrated in FIG. 1 are indicated by like reference numerals, and detailed description thereof will be omitted in light of the previous description of FIG. 1. A frequency command (e.g., an analog voltage or digital value) is applied to a clock signal generator circuit 440, which produces a clock signal having a frequency that varies responsive to the frequency command. The clock signal is applied to a first clock divider circuit 421 that divides the clock signal to produce complementary switch signals to control switches 113, 114 of a first half-bridge. The switching control signals produced by the clock divider circuit 431 may have approximately 50% duty cycle and may maintain dead time between opening and closing operations of switches 113, 114 to provide reduced or substantially zero voltage switching as described in greater detail below.

Switches 111, 112 of a second half-bridge are controlled by similar signals generated by a second clock divider circuit 432. A zero-crossing detector circuit 420 generates a zero-crossing detection signal responsive to a current transformer 410 that senses secondary current $I_s$. The zero-crossing detector circuit 420 generates a pulse in the zero-crossing detection signal when the secondary current $I_s$ is substantially zero, such that the zero crossing detection signal is effectively a clock signal that has a frequency that is slaved to the input clock signal provided by the clock signal generator circuit 440 through the operation of the resonant circuit 130. The zero-crossing detection signal is applied to the second clock divider circuit 432, producing complementary switching control signals that are applied to the switches 111, 112. The switching control signals may have approximately 50% duty cycle, and may maintain dead time between opening and closing operations of the switches 111, 112 to provide reduced or substantially zero voltage switching as described in greater detail below.

It will be appreciated that the embodiments illustrated in FIG. 4 are offered for illustrative purposes, and that a variety of different control circuits may be used with the present invention. For example, it will be appreciated that, in general, the zero-crossing detector circuit 420, the clock signal generator circuit 440 and the clock divider circuits 431, 432, may be implemented using analog and/or digital circuitry, including, but not limited to, special-purpose analog and/or digital circuits and/or special or general purpose computing devices running firmware or software, such as microcontrollers, microprocessors, digital signal processors, and the like. It will also be appreciated that functions of such components may be integrated in a single device, such as a microcontroller, microprocessor or application specific integrated circuit (ASIC), or may distributed among multiple devices.

Figure 5:
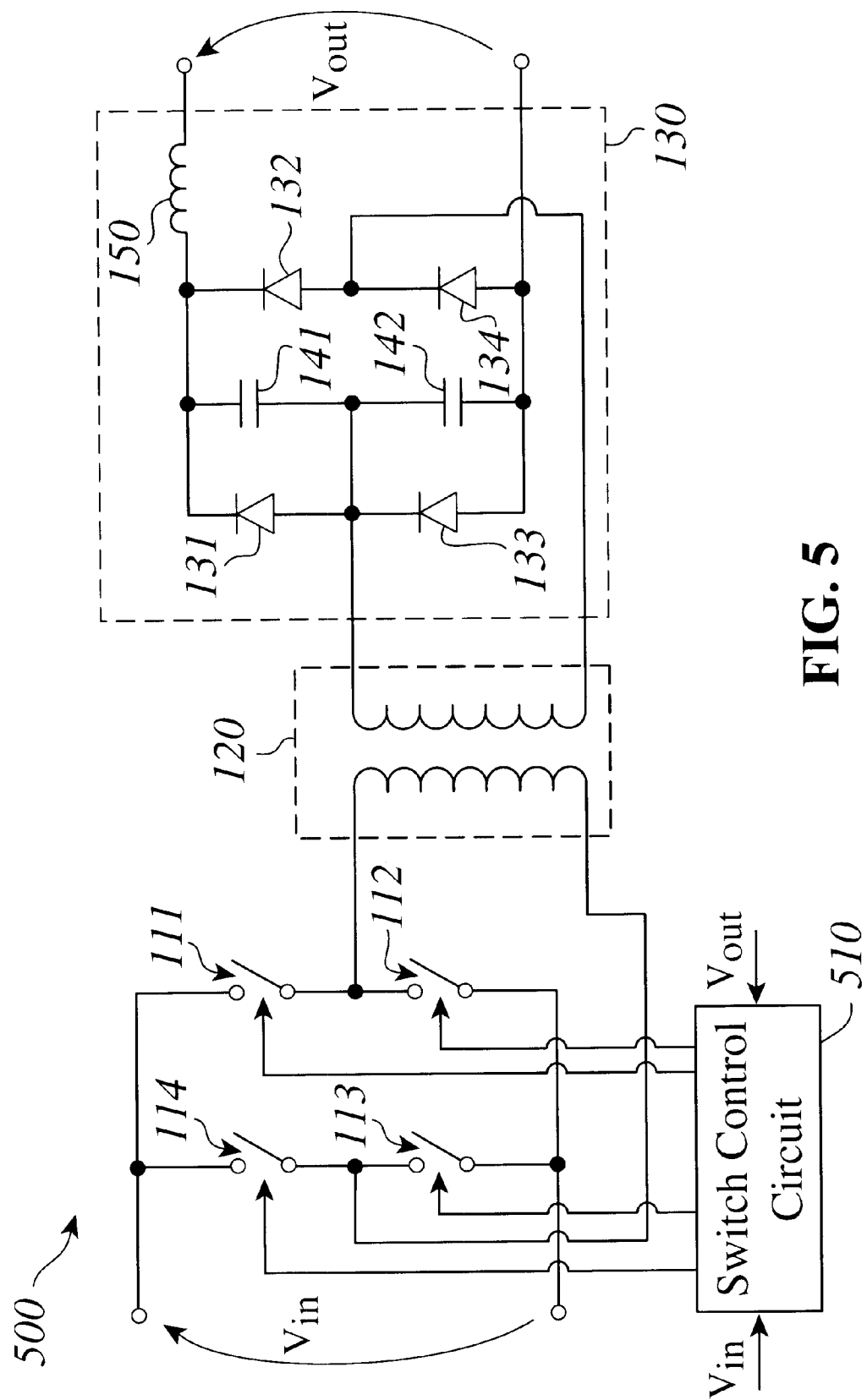

FIG. 5 illustrates a power conversion apparatus 500 according to other embodiments of the invention, which do not require sensing current to maintain desired phasing between half-bridges. Elements of the power conversion apparatus 500 that are identical to those illustrated in FIG. 1 are indicated by like reference numerals, and detailed description thereof will be omitted in light of the previous description of FIG. 1. A switch control circuit 510 is responsive to regulate an output voltage $V_{out}$ using a delay between operations of the first half-bridge (switches 111, 112) and a second half-bridge (switches 113, 114) that is determined based on the input voltage $V_{out}$. An appropriate delay $t_d'$ introduced between operations of the first and second half-bridges by the switch control circuit 510 may be estimated using the relation:

$$t_d'(V_{in}) = t_d(V_{in,\max}, I_{out,\max}) - \frac{t_d(V_{in,\min}, I_{out,\max}) - t_d(V_{in,\max}, I_{out,\max})}{V_{in,\max} - V_{in,\min}} * (V_{in} - V_{in,\min}), \quad (2)$$

where $t_d'(V_{in})$ is the desired delay time for a given value of the input voltage $V_{in}$, $t_d(V_{in,\min}, I_{out,\max})$ is the time required for secondary current to begin to flow and again return to near zero for a minimum input voltage $V_{in,\min}$ and a maximum output current $i_{out,\max}$, and $t_d(V_{in,\max}, I_{out,\max})$ is the time required for secondary current to begin to flow and again return to near zero for a maximum input voltage $V_{in,\max}$ and a maximum output current $I_{out,\max}$. The switching control signals produced by the switch control circuit 510 may have approximately 50% duty cycle, and may introduce appropriate "dead time" between opening and closing operations of the switches 111, 112 and the opening and closing operations of switches 113, 114 to provide reduced or substantially zero voltage switching as described in greater detail below.

Figure 6:
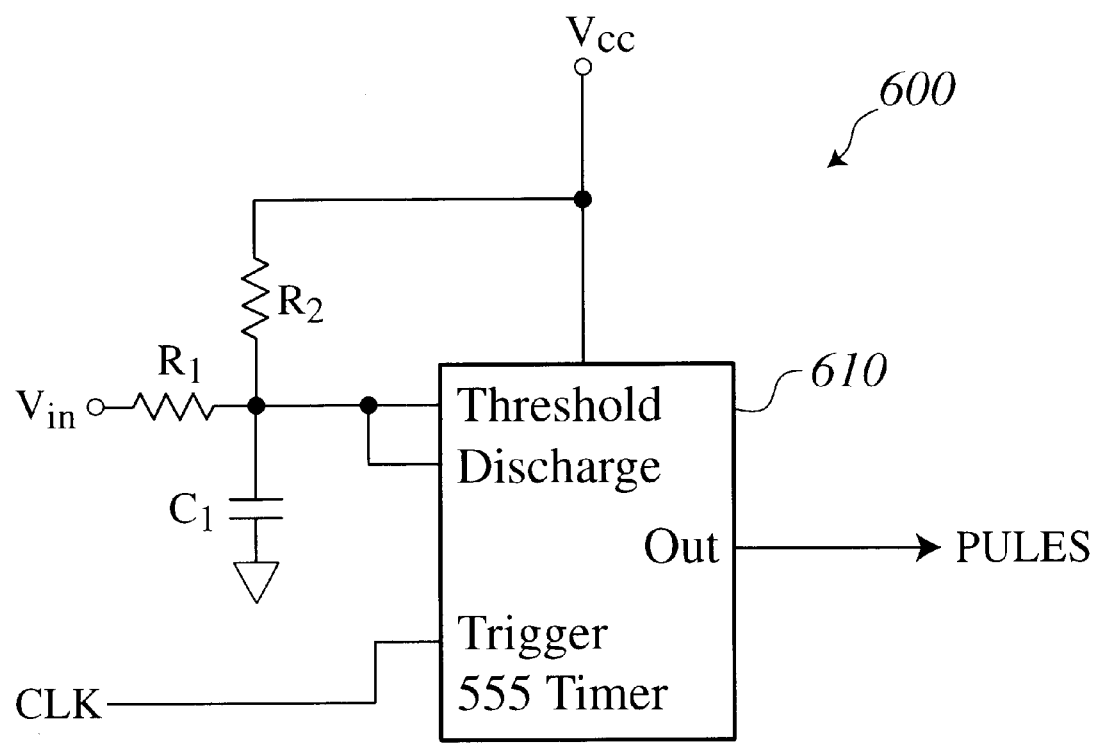
FIG. 6 is a schematic diagram illustrating a timing circuit according to embodiments of the invention.

FIG. 6 illustrates a timing circuit 600 for determining an appropriate delay time from an input voltage $V_{in}$ according to embodiments of the invention. The timing circuit 600 includes a monostable multivibrator 610 (e.g., a "555" timer chip) having a trigger input TRIGGER that receives a clock signal CLK that has a frequency proportional to a desired frequency at which input half-bridges (e.g., switches 111, 112, 113, 114 of FIG. 5) are to operate. Responsive to a transition (e.g., leading edge) of the clock signal CLK, the multivibrator 610 produces a pulse PULSE at an output terminal OUT having a width that is controlled by first and second resistors $R_1$, $R_2$ and a capacitor $C_1$ coupled to a threshold input THRESHOLD. The resistors $R_1$, $R_2$ and the capacitor $C_1$ can be selected such that the pulse width satisfies equation (2).

It will be appreciated that the embodiments illustrated in FIGS. 5–6 are illustrative, and that a variety of different control circuits may be used with the present invention. For example, it will be appreciated that, in general, the switch control circuit 510 of FIG. 5 may be implemented using analog and/or digital circuitry, including, but not limited to, special-purpose analog and/or digital circuits and/or special or general purpose computing devices running firmware or software, such as microcontrollers, microprocessors, digital signal processors, and the like.

As mentioned above, timing of the opening and closing of the switches of a conversion apparatus such as the apparatus 100 of FIG. 1 may be controlled such that reduced or "zero voltage" switching (ZVS) may be achieved in addition to the reduced current switching described above. Exemplary operations for achieving such reduced voltage switching will now be described with reference to FIGS. 7 and 8.

Figure 7:
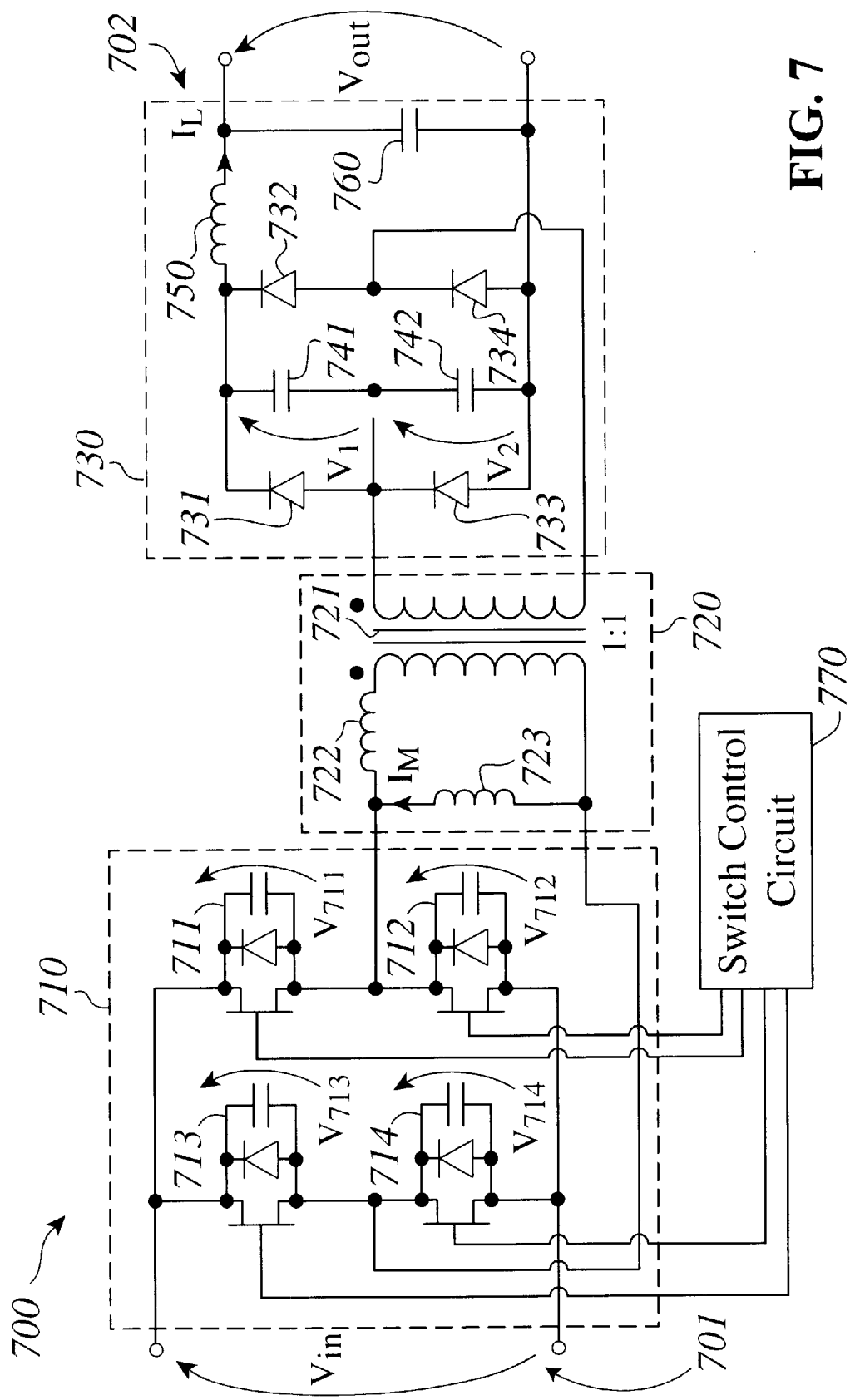
Figure 8A:
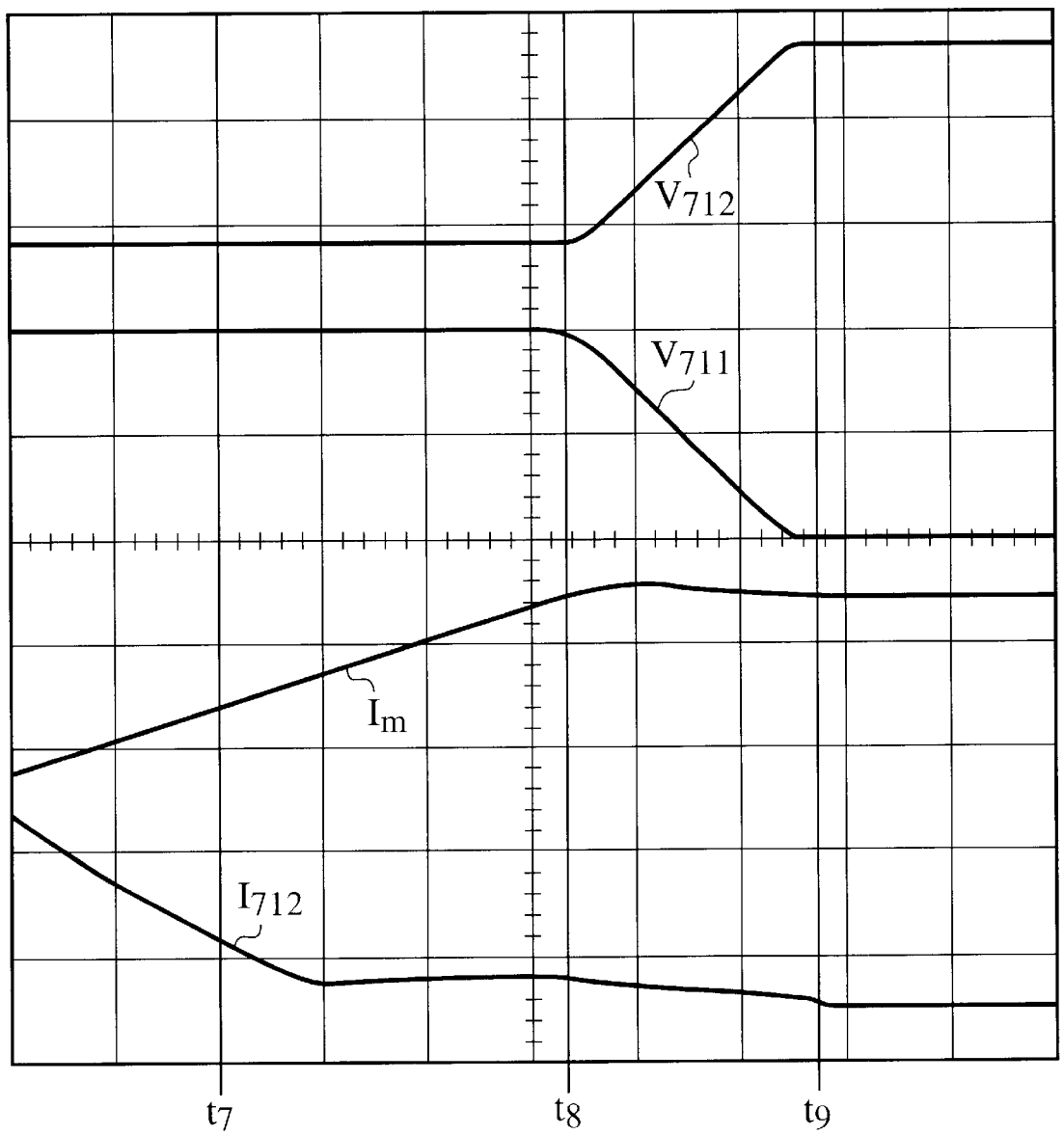
FIGS. 8A–8B are waveform diagrams illustrating exemplary operations of a power conversion apparatus according to embodiments of the invention.
Figure 8B:
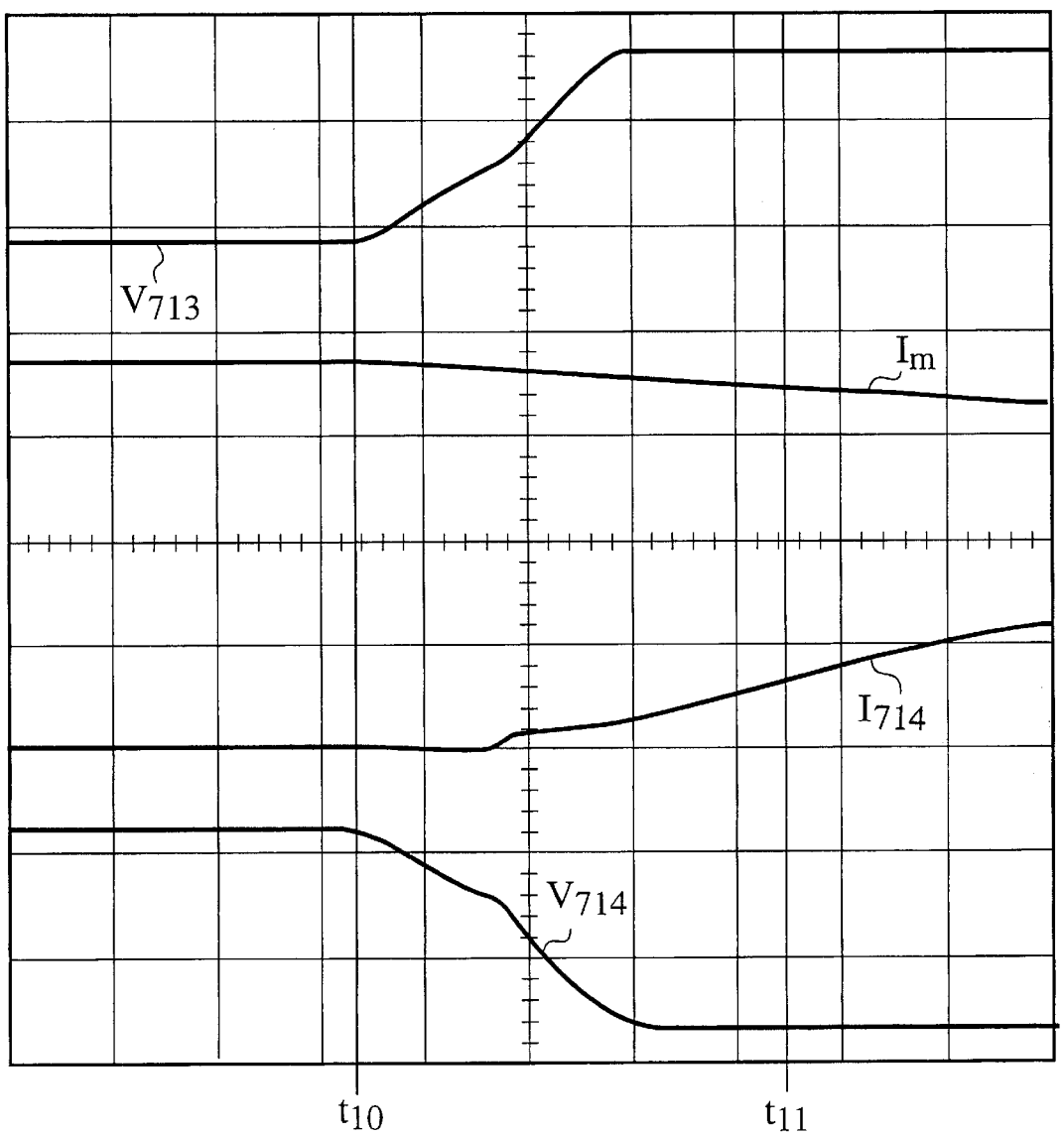

Referring to FIG. 7, a power conversion apparatus 700 according to other embodiments of the present invention includes a full-bridge input switching circuit 710 including switching transistors 711, 712, 713, 714, here shown as MOSFETs which have integral diodes (it will be appreciated that, if switching devices other than MOSFETs are used, actual diodes may be used) and associated switch capacitances. An input port of the switching circuit 710 receives a DC input voltage $V_{in}$ at an input port 701 of the apparatus 700. An output port of the switching circuit 710 is coupled to a primary winding of a transformer 720, here modeled as including an ideal 1:1 transformer 721, a leakage inductance 722 and a magnetizing inductance 723. The switching transistors 711, 712, 713, 714 are controlled by signals generated by a switch control circuit 770. A secondary winding of the transformer 720 is coupled to a output circuit 730 that includes diodes 731, 731, 733, 734 connected in a full bridge configuration, first and second storage capacitors 741, 742, an output inductor 750 and a filter capacitor 760. The apparatus 700 may produce a DC output voltage $V_{out}$ at an output port 702 from an input voltage $V_{in}$ at the input port 701 in a manner similar to that described above with reference to FIG. 1. FIGS. 8A–8B illustrate exemplary switching operations that may be used in passing from a period in which the input voltage $V_{in}$ is applied to the primary of the transformer 720 via switches 712, 713 to a period in which the input voltage $V_{in}$ is applied to the primary of the transformer 720 via switches 711, 714. It will be readily apparent that similar switching operations are also applicable to a transition from a period in which the input voltage $V_{in}$ is applied to the primary of the transformer 720 via switches 711, 714 to a period in which the input voltage $V_{in}$ is applied to the primary of the transformer 720 via switches 712, 713.

In a time interval from a time $t_7$ to time $t_8$, switches 711, 714 are off while switches 712 and 713 are on, thus applying the input voltage $V_{in}$ to the primary of the transformer 720 during an energy transfer cycle in which a current $I_{712}$ flowing through the switch 712 first increases and then decreases through the operation of the resonant circuit 730, in manner similar to that described above with reference to FIGS. 1 and 2. The application of the input voltage $V_{in}$ across the primary of the transformer 720 also causes a magnetizing current $I^m$ flowing through the magnetizing inductance 723 to increase in magnitude. At time $t_8$ (i.e., a time at when a current through the switch 712 reaches a desirably low level), switch 712 is opened, leaving the primary of the transformer 720 open-circuited. When switch 712 is opened, the magnetizing current $I_m$ begins to charge the capacitance of switch 712 and to concurrently discharge the capacitance of switch 711. Voltage $V_{711}$ across switch 711 decreases while the voltage $V_{712}$ across switch 712 increases. Once the voltage $V_{712}$ approaches the input voltage $V_{in}$, the integral diode of switch 711 begins to conduct. Eventually, the voltage $V_{711}$ is reduced to the point that switch 711 can be turned on at time $t_9$ under reduced or substantially near zero voltage conditions. After switch 711 is turned on at time $t_9$, switches 711 and 713 short the primary of the transformer 720, "trapping" the magnetizing current $I_m$ in the primary of the transformer 720.

It will be understood that optimal reduction in switching losses may be achieved if the interval between the opening of switch 712 and the closing of switch 711 is sufficiently long to allow the voltage across the switch 711 to reach substantially near zero voltage. A minimum time to achieve substantially zero voltage may be viewed at the time required for the magnetizing current $I^m$ to charge the total effective capacitance at the junction of switches 711, 712 to the input voltage $V_{in}$. However, it will be understood that longer delays may be used, as the diode across switch 711 will conduct to maintain a low voltage across switch 711.

Referring now to FIG. 8B, at time $t_{10}$, switch 713 is turned off, causing the magnetizing current $I^m$ to charge the capacitance of switch 713 and to concurrently discharge the capacitance of switch 714 as the voltage $V_{713}$ across switch 713 increases towards the input voltage $V_{in}$ and the voltage $V_{714}$ across switch 714 eventually falls near zero, such that switch 714 may be turned on at $t_{11}$ under reduced or substantially near zero voltage conditions. Upon closing of switch 714, current $I_{714}$ through switch 714 begins to build as a new energy transfer cycle begins.

Unlike the previous transition between the opening of switch 712 and the closing of switch 711, however, the opening of switch 713 causes voltage across the primary of the transformer 720 to build up. In order for the voltage across switch 714 to be reduced to near zero, the magnetizing current $I_m$ preferably is at least equal to current that builds up in the leakage inductance 722 as the voltage $V_{713}$ across switch 713 approaches the input voltage $V_{in}$. Otherwise, if the current in the leakage inductance 722 becomes equal to the magnetizing current $I^m$ before the voltage $V_{sw3}$ across switch 713 approaches $V_{in}$, the charging/discharging process may stop before the voltage $V_{sw4}$ across switch 714 reaches a desirably low level.

From the above description, it can be seen that a difference in operation exists between the transition of the "leading" half-bridge comprising switches 711, 712 and the transition of the "trailing" half-bridge comprising switches 713, 714. In order to reduce losses associated with the charging/discharging of the switch capacitances, it may be advantageous for energy provided by the magnetizing current $I_m$ to be sufficient to fully discharge the switch capacitances without undue dissipation in the switches and the transformer 720. However, it will be appreciated that other performance criteria, such as electromagnetic interference (EMI) criteria, may influence the selection of the proper magnetizing inductance and the dead time between switching operations of the half-bridges.

If it is assumed that capacitances of the switches 713, 714 are independent of the voltage and a time interval ($t_{10}$–$t_9$) between time $t_9$ and time $t_{10}$ is constant, an energy constraint for the switching of switches 713, 714 may be expressed as:

$$\tfrac{1}{2} L * I_{m,pk}^2 = \tfrac{1}{2} C_{sw} * V_{in}^2, \tag{3}$$

where L is the value of the leakage inductance 722, $I_{m,pk}$ is the peak value of the magnetizing current $I_m$, $C_{sw}$ is the total capacitance of the switches 711, 713. The peak magnetizing current $I_{m,pk}$ may be expressed as:

$$I_{m,pk} = \frac{1}{2} * \frac{V_{in}}{L_m * (t_{10} - t_9)}, \tag{4}$$

where $L_m$ is the value of the magnetizing inductance 723.

An advantageous value $L_m$ for the magetizing inductance 723 can be found by combining equations (3) and (4) to produce:

$$L_m = \tfrac{1}{2} * (t_{10} - t_9) * L/C_{sw}. \tag{5}$$

As mentioned above, in addition to providing adequate magnetizing energy to allow zero voltage switching of switches 713, 714, it may also desirable to provide sufficient delay between the switching of switches 711, 712 to allow these switches to be operated under substantially zero voltage conditions. If the magnetizing energy is exactly equal to that defined by equation (3), it may be desirable that the delay $t_{d1}$ between the operations of switches 711, 712 be approximately equal to a quarter of the natural period of oscillation of L and $C_{sw}$:

$$t_{dl} = \frac{\pi \sqrt{LC_{sw}}}{2}. \tag{6}$$

It will be understood that output circuits according to the invention may have different configurations than those illustrated in FIGS. 1 and 3–5 and 7. In embodiments of the invention shown in FIG. 9, a output circuit 930 coupled to first and second secondary windings 922a, 922b of a transformer 920 may include parallel-connected resonant circuits 930a, 930b that produce an output voltage $V_{out}$ across an output capacitor 960. The first output circuit 930a includes diodes 931, 932 which control energy transfer to a first capacitor 941 and on to a load (not shown) coupled across the output capacitor 960 via a first output inductor 951 responsive to application of a voltage of a first polarity across a primary winding 921, in a manner similar to that described with reference to FIG. 1. The second output circuit 930b includes diodes 933, 934 that control energy transfer to a second capacitor 942 and on to a load via a second output inductor 952 responsive to application of an opposite polarity voltage across the primary winding 921.

Figure 10:
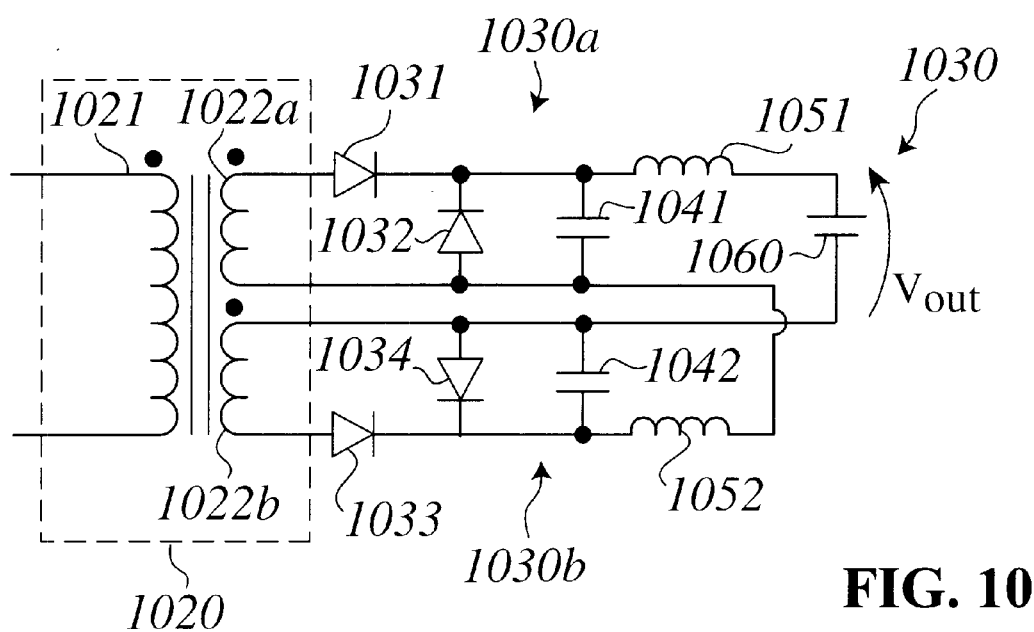

In embodiments of the invention illustrated in FIG. 10, a output circuit 1030 coupled to first and second secondary windings 1022a, 1022b of a transformer 1020 includes series-connected output circuits 1030a, 1030b. The first output circuit 1030a includes diodes 1031, 1032 that control energy transfer to a first capacitor 1041 and on to a load (not shown) coupled across an output capacitor 1060 via a first output inductor 1051 responsive to application of a voltage of a first polarity across a primary winding 1021 of the transformer 1020, in a manner similar to that described above with reference to FIG. 1. The second output circuit 1020b includes diodes 1033, 1034 that control energy transfer to a second capacitor 1042 and on to the load via a second inductor 1052 responsive to application of an opposite polarity voltage cross the primary winding 1021.

Figure 9:
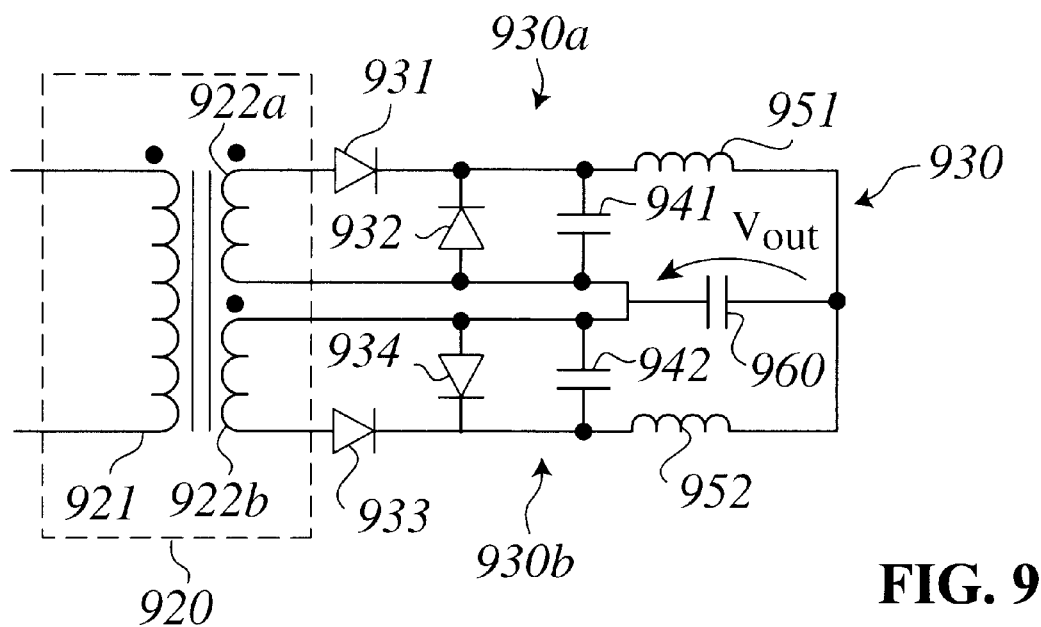
FIGS. 9 and 10 are schematic diagrams illustrating output circuits according to embodiments of the invention.

It will be appreciated that the circuit topologies illustrated in FIGS. 9 and 10 ay be controlled using techniques similar to those described above with reference to FIGS. 1–8. It will also be appreciated that, in other embodiments of the invention, an output circuit for a power conversion apparatus may be constructed such that it is reconfigurable to either of the output circuit topologies of FIGS. 9 and 10 using, for example, appropriate switching elements. In such a manner, a power conversion apparatus capable of supplying different output voltage levels may be provided.

Figure 11:
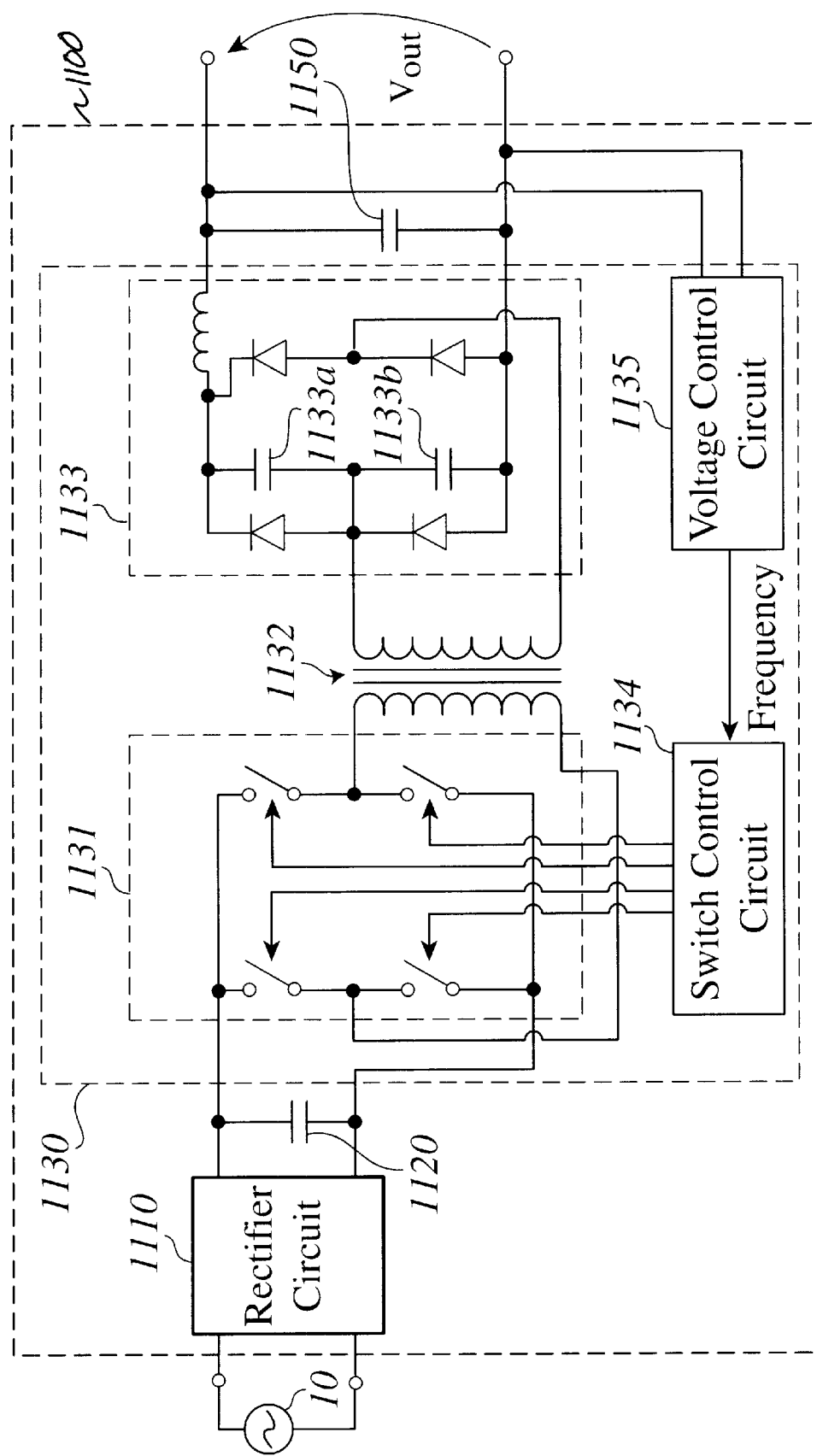
FIG. 11 is a schematic diagram illustrating a power supply according to embodiments of the invention.

FIG. 11 illustrates a power supply 1100 according to embodiments of the present invention, which includes a DC-DC power converter 1120 that can provide reduced current and/or reduced voltage switching as described above. The power supply 1100 is configured to connect to an AC power supply 10, and includes a rectifier circuit 1110 that receives an AC input voltage VAC from the AC power supply 10, and provides a DC voltage VDC to an energy storage circuit, here shown as a capacitor 1120.

The power supply 110 further includes a power converter 1130 that receives the DC voltage VDC and generates an output voltage Vout therefrom. In particular, the power converter 1130 includes a switching circuit 1131 that, responsive to control signals generated by a voltage control circuit 1134, applies the DC voltage VDC with alternating polarity across a primary winding of a transformer 1132, e.g, in a manner as described above. An output circuit 1133 coupled to a secondary winding of the transformer 1132 generates the output voltage Vout using alternating energy transfers via first and second capacitors 1133a, 1133b. The voltage control circuit 1134 controls the switching circuit 1131 based on the output voltage $V_{out}$, e.g, by modulating the frequency at which first and second half-bridges in the switching circuit 1131 operate, as described above. Preferably, the voltage control circuit 1134 controls the switching circuit 1131 to provide reduced current and voltage switching as described above.

It will be appreciated that the power supply 1100 is presented for illustrative purposes, and that the invention may be used in a variety of other applications. For example, power converters according to the invention may be used in other types of power supplies, such as uninterruptible power supplies, as well as in other DC-DC converter applications. These may include, for example, rack-mounted power supplies, power supplies integrated in devices such as computers or telecommunications equipment, and integrated circuit power conversion devices.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A power conversion apparatus, comprising:
   a transformer having primary and secondary windings;
   a first switching circuit having an input port configured to be coupled across a DC power source and an output port coupled to the primary winding of the transformer;
   a switch control circuit, operatively associated with the first switching circuit, that causes the first switching circuit to alternately apply first and second polarity voltages to the primary winding;
   first and second capacitors;
   an output inductor configured to be coupled to a load; and
   a second switching circuit coupled to secondary winding, the first and second capacitors and the output inductor and operative to transfer energy to the load from the secondary winding via respective ones of the first capacitor and the second capacitor responsive to respective ones of the application of the first polarity voltage to the primary winding and the application of the second polarity voltage to the primary winding.

2. An apparatus according to claim 1, wherein the first switching circuit comprises at least one switch, and wherein the switch control circuit constrains the at least one switch to operate when current in the at least one switch falls to a predetermined level.

3. An apparatus according to claim 2, wherein the switch control circuit operates the at least one switch responsive to a current through the transformer.

4. An apparatus according to claim 2, wherein the switch control circuit operates the at least one switch responsive to a current through the switch.

5. An apparatus according to claim 2, wherein the switch control circuit estimates a time when current in the at least one switch will reach the predetermined level and operates the at least one switch based on the estimated time.

6. An apparatus according to claim 1:
   wherein the first switching circuit comprises first and second half bridges; and
   wherein the switch control circuit controls a time delay between operations of the first and second half-bridges.

7. An apparatus according to claim 6, wherein the switch control circuit controls the time delay such that the first and second half-bridges operate under substantially zero current switching conditions.

8. An apparatus according to claim 6, wherein the switch control circuit maintains a fixed time delay between operations of the first and second half-bridges.

9. An apparatus according to claim 6, wherein the switch control circuit varies the time delay responsive to a sensed current.

10. An apparatus according to claim 6, wherein the switch control circuit varies the time delay responsive to an input voltage applied to the first switching circuit.

11. An apparatus according to claim 6, wherein the switching control circuit varies a frequency at which the first and second half-bridges operate responsive to an output voltage applied to the load.

12. An apparatus according to claim 1, wherein the first switching circuit comprises at least one switch, and wherein the switch control circuit constrains the at least one switch to operate when voltage across the at least one switch falls to a predetermined level.

13. An apparatus according to claim 12, wherein the switch control circuit constrains the at least one switch to operate when voltage across the at least one switch falls to substantially zero volts.

14. An apparatus according to claim 1:
wherein the first switching circuit comprises a first half-bridge including first and second switches and a second half-bridge including third and fourth switches; and
wherein the switch control circuit, in transitioning the first switching circuit from a first state in which the second and third switches are closed and the first and fourth switches are open and a second state in which the first and third switches are closed and the second and fourth switches are open, opens the second switch before closing the first switch such that a voltage across the first switch is reduced before the first switch closes.

15. An apparatus according to claim 14, wherein the switch control circuit opens the second switch a sufficient time before closing the first switch to allow the voltage across the first switch to fall to substantially zero volts before the first switch closes.

16. An apparatus according to claim 14, wherein the switch control circuit, in transitioning the first switching circuit from the second state to a third state in which the first and fourth switches are closed and the first and third switches are open, opens the third switch before closing the fourth switch such that a voltage across the fourth switch is reduced before the fourth switch closes.

17. An apparatus according to claim 16, wherein the switch control circuit opens the third switch a sufficient time before closing the fourth switch to allow the voltage across the fourth switch to fall to substantially zero volts before the fourth switch is closed.

18. An apparatus according to claim 1, wherein the second switching circuit comprises a plurality of diodes.

19. A power conversion apparatus, comprising:
a transformer having primary and secondary windings;
first and second half-bridges configured to be coupled across a DC power source and coupled to respective first and second terminals of the primary winding of the transformer;
an output circuit coupled to the secondary winding of the transformer and including first and second capacitors and at least one inductor configured to be coupled to a load, the output circuit operative to transfer energy to the load from the secondary winding via the first capacitor responsive to application of a first polarity voltage to the primary winding of the transfer and to transfer energy to the load from the secondary winding via the second capacitor responsive to application of a second polarity voltage to the primary winding of the transformer; and
a switch control circuit, operatively associated with the first and second half-bridges, that varies a frequency at which the first and second half-bridges operate responsive to an output voltage produced by the output circuit.

20. An apparatus according to claim 19, wherein the switch control circuit is operative to control a time delay between operations of the first and second half-bridges.

21. An apparatus according to claim 20, wherein the switch control circuit controls the time delay such that the first and second half-bridges operate under substantially zero current switching conditions.

22. An apparatus according to claim 20, wherein the switch control circuit maintains a fixed time delay between operations of the first and second half-bridges.

23. An apparatus according to claim 20, wherein the switch control circuit varies the time delay responsive to a sensed current.

24. An apparatus according to claim 20, wherein the switch control circuit varies the time delay responsive to an input voltage applied to the first and second half-bridges.

25. An apparatus according to claim 19, wherein the output circuit comprises a switching circuit, coupled to the secondary winding, the first and second capacitors, and the at least one output inductor, and operative to transfer energy to the load from the secondary winding via the first capacitor responsive to application of the first polarity voltage to the primary winding and to transfer energy to the load from the secondary winding via the second capacitor responsive to application of the second polarity voltage to the primary winding.

26. An apparatus according to claim 25, wherein the switching circuit comprises one of a passive diode network and an active switching network.

27. A power conversion apparatus, comprising:
a transformer having primary and secondary windings;
a switching circuit coupled to the primary winding of the transformer and configured to be coupled to a DC power source, the switching circuit operative to couple the DC power source to the primary winding of the transformer with a first polarity in a first state and to couple the DC power source to the primary winding of the transformer with a second polarity in a second state; and
an output circuit coupled to the secondary winding of the transformer and including first and second capacitors and at least one inductor configured to be coupled to a load, the output circuit operative to transfer energy to the load from the secondary winding via the first capacitor responsive to the first state of the switching circuit and to transfer energy to the load from the secondary winding via the second capacitor responsive to the second state of the switching circuit.

28. An apparatus according to claim 27:
wherein the output circuit, when the switching circuit is in the first state, delivers current from the secondary winding to the first capacitor responsive to current in the secondary winding exceeding a first level and reduces current in the secondary winding responsive to discharge of the first capacitor; and
wherein the output circuit, when the switching circuit is in the second state, delivers current from the secondary winding to the second capacitor responsive to current in the secondary winding exceeding a second level and reduces current in the secondary winding responsive to discharge of the second capacitor.

29. An apparatus according to claim 28, wherein respective capacitances of the first and second capacitors are such that respective discharge currents produced from respective ones of the first and second capacitors in response to respective ones of the first and second states of the switching circuit are sufficient to cause the output circuit to block current flow in the secondary winding.

30. An apparatus according to claim 28:
wherein the output circuit, when the first switching circuit is in the first state, delivers current from the secondary winding to the first capacitor responsive to current in the secondary winding exceeding a current demand of the load and then discharges current from the first capacitor through the at least one output inductor to supply current to the load;

wherein the output circuit, when the switching circuit is in the second state, delivers current from the secondary winding to the second capacitor responsive to current in the secondary winding exceeding a current demand of the load and then discharges the second capacitor through the at least one output inductor to supply current to the load.

31. An apparatus according to claim 30, wherein respective capacitances of the first and second capacitors are such that respective peak discharge currents produced from respective ones of the first and second capacitors responsive to respective ones of the first and second states of the switching circuit are greater than or equal to a current delivered to the load via the at least one inductor.

32. An apparatus according to claim 27, wherein the switching circuit short circuits the primary winding in an interval occurring between respective periods in which the switching circuit is in respective ones of the first and second states.

33. An apparatus according to claim 32, wherein the switching circuit short circuits the primary winding when a current in the transformer meets a predetermined criterion.

34. An apparatus according to claim 33, further comprising a sensor that senses a current in at least one of the primary and secondary windings, wherein the switching circuit short is responsive to the sensor such that the switching circuit short circuits the primary winding when the sensed current meets a predetermined criterion.

35. An apparatus according to claim 33, further comprising a switch control circuit that predicts a time at which current in at least one of the primary winding and the secondary winding meets a predetermined criterion and that causes the switching circuit to short the primary winding based on the predicted time.

36. An apparatus according to claim 32, wherein the switching circuit short circuits the primary winding responsive to lapse of a predetermined time interval following transition to either one of the first and second states.

37. An apparatus according to claim 27, wherein the switching circuit varies a frequency at which the switching circuit alternates between the first and second states to control an output voltage applied to the load.

38. An apparatus according to claim 27, wherein the switching circuit comprises:
first and second input terminals configured to be coupled to first and second terminals of a DC power source;
a first switch that selectively couples the first input terminal to a first terminal of the primary winding;
a second switch that selectively couples the second input terminal to the first terminal of the primary winding;
a third switch that selectively couples the first input terminal to a second terminal of the primary winding;
a fourth switch that selectively couples the second input terminal to the second terminal of the primary winding; and
a switch control circuit that controls the first, second, third and fourth switches.

39. An apparatus according to claim 38:
wherein the switch control circuit, when the switching circuit is in the first state, couples the first input terminal to the first terminal of the primary winding via the first switch and couples the second input terminal to the second terminal of the primary winding via the fourth switch; and wherein the switch control circuit, when the switching circuit is in the second state, couples the first input terminal to the second terminal of the primary winding via the third switch and couples the second input terminal to the first terminal of the primary winding via the second switch.

40. An apparatus according to claim 27, wherein the switching circuit comprises a first switching circuit, and wherein the output circuit comprises a second switching circuit that controls current flow between the secondary winding, the first and second capacitors and the at least one output inductor.

41. An apparatus according to claim 40, wherein second switching circuit controls current flow between the secondary winding, the first and second capacitors and the at least one output inductor such that:
when the first switching circuit is in the first state, the second switching circuit clamps the first capacitor when current in the secondary winding is less than a first level, conducts current from the secondary winding to the first capacitor responsive to current in the secondary winding exceeding a second level, and reduces current flow in the secondary winding responsive to discharge of the first capacitor; and when the first switching circuit is in the second state, the second switching circuit clamps the second capacitor when current in the secondary winding is less than a third level, conducts current from the secondary winding to the second capacitor when current in the secondary winding exceeds a fourth level, and reduces current flow in the secondary winding responsive to discharge of the second capacitor.

42. An apparatus according to claim 41:
wherein the second switching circuit, when the first switching circuit is in the first state, clamps the first capacitor when current in the secondary winding is less than current in the at least one output inductor and conducts current from the secondary winding to the first capacitor responsive to current in the secondary winding exceeding current in the at least one output inductor; and wherein the second switching circuit, when the first switching circuit is in the second state, clamps the second capacitor when current in the secondary winding is less than current in the at least one output inductor and conducts current from the secondary winding to the second capacitor responsive to current in the secondary winding exceeding current in the at least one output inductor.

43. An apparatus according to claim 40:
wherein the output circuit comprises first and second output terminals configured to be coupled to the load;
wherein the at least one inductor comprises an inductor that couples a first terminal of the first capacitor to the first output terminal;
wherein a second terminal of the first capacitor is coupled to a first terminal of the secondary winding;
wherein a first terminal of the second capacitor is coupled to the second output terminal;

wherein a second terminal of the second capacitor is coupled to the first terminal of the secondary winding;

wherein the second switching circuit comprises:
  a first switch that selectively couples the first terminal of the secondary winding to the first terminal of the first capacitor;
  a second switch that selectively couples a second terminal of the secondary winding to the first terminal of the first capacitor;
  a third switch that selectively couples the first terminal of the secondary winding to the first terminal of the second capacitor; and
  a fourth switch that selectively couples the second terminal of the secondary winding to the first terminal of the second capacitor.

44. An apparatus according to claim 43, wherein the first capacitor is connected in parallel with the first switch and wherein the second capacitor is connected in parallel with the third switch.

45. An apparatus according to claim 43, wherein the first, second, third and fourth switches comprise respective first, second, third and fourth diodes.

46. An apparatus according to claim 40:
  wherein the output circuit comprises an output port configured to be coupled to the load;
  wherein the second switching circuit comprises a full bridge rectifier having a rectifier input port coupled to first and second terminals of the secondary winding of the transformer and a rectifier output port connected in series with the at least one output inductor and the output port;
  wherein the first capacitor is coupled between a first terminal of the rectifier output port and the first terminal of the secondary winding; and
  wherein the second capacitor is coupled between a second terminal of the rectifier output port and the first terminal of the secondary winding.

47. An apparatus according to claim 46, wherein the full-bridge rectifier comprises a passive diode bridge.

48. An apparatus according to claim 47, wherein the full bridge rectifier comprises an active bridge rectifier.

49. An apparatus according to claim 40:
  wherein the secondary winding of the transformer comprises first and second secondary windings, each of which is magnetically coupled to the primary winding;
  wherein the output circuit comprises an output port configured to be coupled to a load;
  wherein the at least one output inductor comprises a first output inductor that couples the first capacitor to the output port and a second output inductor that couples the second capacitor to the output port;
  wherein a first terminal of the first capacitor is coupled to a first terminal of the first secondary winding;
  wherein a first terminal of the second capacitor is coupled to a second terminal of the second secondary winding; and
  wherein the second switching circuit comprises:
    a first switch that selectively couples the first terminal of the first secondary winding to the first output inductor and a second terminal of the first capacitor;
    a second switch that selectively couples a second terminal of the first secondary winding to the first output inductor and the second terminal of the first capacitor;
    a third switch that selectively couples a first terminal of the second secondary winding to the second output inductor and a second terminal of the second capacitor; and
    a fourth switch that selectively couples a second terminal of the second secondary winding to the second output inductor and the second terminal of the second capacitor.

50. An apparatus according to claim 49, wherein the first terminal of the first capacitor and the first terminal of the second capacitor are coupled to a first terminal of the output port of the output circuit and the first output inductor and the, second output inductor are coupled to a second terminal of the output port of the output circuit.

51. An apparatus according to claim 49, wherein the first, second, third and fourth switches comprise respective first, second, third and fourth diodes.

52. An apparatus according to claim 40:
  wherein the secondary winding of the transformer comprises first and second secondary windings, each of which is magnetically coupled to the primary winding;
  wherein t he output circuit comprises an output port configured to be coupled to a load;
  wherein the at least one output inductor comprises a first output inductor that couples a first terminal of the first capacitor to a first terminal of the output port and a second output inductor that couples a first terminal of the second capacitor to a second terminal of the first capacitor and to a first terminal of the first secondary winding;
  wherein a second terminal of the second capacitor is coupled to a second terminal of the output port and to a first terminal of the second secondary winding;
  wherein first terminal of the second capacitor is coupled to a second terminal of the second secondary winding; and
  wherein the second switching circuit comprises:
    a first switch that selectively couples a second terminal of the first secondary winding to the first terminal of the first capacitor ;
    a second switch that selectively couples the first terminal of the first secondary winding to the first terminal of the first capacitor;
    a third switch that selectively couples a second terminal of the second secondary winding to the first terminal of the second capacitor; and
    a fourth switch that selectively couples the first terminal of the second secondary winding to the first terminal of the second capacitor.

53. A power supply, comprising:
  a rectifier circuit configured to receive and AC input voltage and operative to generate a DC voltage therefrom;
  a transformer having primary and secondary windings;
  a first switching circuit coupled to the rectifier circuit and having an output port coupled to the primary winding of the transformer,
  a switch control circuit, operatively associated with the first switching circuit, that causes the first switching circuit to alternately apply the DC voltage with first and second polarities to the primary winding;
  first and second capacitors;
  an output inductor configured to be coupled to a load; and
  a second switching circuit coupled to secondary winding, the first and second capacitors and the output inductor and operative to transfer energy to the load from the secondary winding via the first capacitor responsive to application of the DC voltage with the first polarity voltage to the primary winding and to transfer energy to the load from the secondary winding via the second capacitor responsive to application of the DC voltage with the second polarity to the primary winding.

54. An apparatus according to claim 53:
wherein the first switching circuit comprises first and second half bridges; and
wherein the switching control circuit varies a frequency at which the first and second half-bridges operate responsive to an output voltage applied to the load.

55. An apparatus according to claim 53:
wherein the first switching circuit comprises first and second half bridges; and
wherein the switch control circuit controls a time delay between operations of the first and second half-bridges.

56. An apparatus according to claim 55, wherein the switch control circuit controls the time delay such that the first and second half-bridges operate under substantially zero current switching conditions.

57. An apparatus according to claim 53, wherein the first switching circuit comprises at least one switch, and wherein the switch control circuit constrains the at least one switch to operate when voltage across the at least one switch falls to a predetermined level.

58. An apparatus according to claim 57, wherein the switch control circuit constrains the at least one switch to operate when voltage across the at least one switch falls to substantially zero volts.

59. A method of converting power, the method comprising:
alternately applying first and second polarity voltages to a primary winding of a transformer;
transferring energy to a load from a secondary winding of the transformer via a first capacitor responsive to application of the first polarity voltage to the primary winding; and
transferring energy to the load from the secondary winding via a second capacitor responsive to application of the second polarity voltage to the primary winding.

60. A method according to claim 59, wherein the step of alternately applying first and second polarity voltages to a primary winding comprises operating a switching circuit coupled to a DC power source and to the primary winding such that at least one switch of the switching current is constrained to operate when current in the at least one switch falls to a predetermined level.

61. A method according to claim 60, wherein the step of operating a switching circuit comprises the step of operating the at least one switch responsive to a current through the transformer.

62. A method according to claim 60, wherein the step of operating a switching circuit comprises estimating a time when current in the at least one switch will reach the predetermined level and operating the at least one switch based on the estimated time.

63. A method according to claim 59, wherein the step of alternately applying first and second polarity voltages to a primary winding comprises controlling a frequency at which first and second half-bridges of a switching circuit that couples a DC power source to the primary operate.

64. A method according to claim 63, wherein the step of alternately applying first and second polarity voltages to a primary winding further comprises controlling a time delay between operations of the first and second half-bridges.

65. A method according to claim 64, wherein the step of controlling a time delay comprises controlling the time delay such that the first and second half-bridges operate under substantially zero current switching conditions.

66. A method according to claim 64, wherein the step of controlling a time delay comprises maintaining a fixed time delay between operations of the first and second half-bridges.

67. A method according to claim 64, wherein the step of controlling a time delay comprises varying the time delay responsive to a sensed current.

68. A method according to claim 64, wherein the step of controlling a time delay comprises varying the time delay responsive to an input voltage applied to the switching circuit.

69. A method according to claim 58, wherein the step of alternately applying first and second polarity voltages to a primary winding comprises operating a switching circuit coupled to a DC power source and to the primary winding such that at least one switch of the switching circuit is constrained to operate when voltage across the at least one switch falls to a predetermined level.

70. A method according to claim 69, wherein the step of operating a switching circuit comprises constraining the at least one switch to operate when voltage across the at least one switch falls to substantially zero volts.

71. A method according to claim 59, wherein the step of alternately applying first and second polarity voltages to a primary winding comprises:
operating a switching circuit coupled to a DC power source and to the primary winding, the switching circuit including a first half-bridge including first and second switches and a second half-bridge including third and fourth switches; and
transitioning the switching circuit from a first state in which the second and third switches are closed and the first and fourth switches are open and a second state in which the first and third switches are closed and the second and fourth switches are open by opening the second switch before closing the first switch such that a voltage across the first switch is reduced before the first switch closes.

72. A method according to claim 71, wherein the step of opening the second switch before closing the first switch such that a voltage across the first switch is reduced before the first switch closes comprises opening the second switch a sufficient time before closing the first switch to allow the voltage across the first switch top fall to substantially zero volts before the first switch closes.

73. A method according to claim 71, wherein the step of alternately applying first and second polarity voltages to a primary winding comprises transitioning the switching circuit from the second state to a third state in which the first and fourth switches are closed and the first and third switches are open by opening the third switch before closing the fourth switch such that a voltage across the fourth switch is reduced before the fourth switch closes.

74. A method according to claim 73, wherein the step of opening the third switch before closing the fourth switch such that a voltage across the fourth switch is reduced before the fourth switch closes comprises opening the third switch a sufficient time before closing the fourth switch to allow the voltage across the fourth switch to fall to substantially zero volts before the fourth switch is closed.

* * * * *